(12) United States Patent
Kobayashi et al.

(10) Patent No.: US 11,733,063 B2
(45) Date of Patent: Aug. 22, 2023

(54) POSITION SENSOR

(71) Applicant: DENSO CORPORATION, Kariya (JP)

(72) Inventors: Atsushi Kobayashi, Kariya (JP);
Yasuhiro Kitaura, Kariya (JP);
Michihiro Makita, Kariya (JP); Akito Sasaki, Kariya (JP); Tetsuya Ohmi, Kariya (JP)

(73) Assignee: DENSO CORPORATION, Kariya (JP)

( * ) Notice: Subject to any disclaimer, the term of this patent is extended or adjusted under 35 U.S.C. 154(b) by 511 days.

(21) Appl. No.: 16/697,902

(22) Filed: Nov. 27, 2019

(65) Prior Publication Data

US 2020/0096368 A1  Mar. 26, 2020

Related U.S. Application Data

(63) Continuation of application No. PCT/JP2018/019060, filed on May 17, 2018.

(30) Foreign Application Priority Data

Jun. 16, 2017 (JP) .................. 2017-118778

(51) Int. Cl.
*G01D 5/14* (2006.01)
*G01D 11/30* (2006.01)

(52) U.S. Cl.
CPC ............. *G01D 5/145* (2013.01); *G01D 11/30* (2013.01)

(58) Field of Classification Search
CPC ................................ G01D 5/145; G01D 11/30
See application file for complete search history.

(56) References Cited

U.S. PATENT DOCUMENTS 6,452,381 B1 * 9/2002 Nakatani ................ G01D 5/147
324/207.21
2005/0225321 A1 * 10/2005 Kurumado ............. G01D 5/147
324/207.21

(Continued)

FOREIGN PATENT DOCUMENTS

JP  2009-014454 A   1/2009
JP  2009-139252 A   6/2009

(Continued)

OTHER PUBLICATIONS

U.S. Appl. No. 16/676,645, filed Nov. 7, 2019, Kobayashi et al.
U.S. Appl. No. 16/697,806, filed Nov. 27, 2019, Kitaura et al.
U.S. Appl. No. 16/677,975, filed Nov. 8, 2019, Sasaki et al.

*Primary Examiner* — Clayton E. LaBalle
*Assistant Examiner* — Michael A Harrison
(74) *Attorney, Agent, or Firm* — Posz Law Group, PLC

(57) ABSTRACT

A position sensor includes a detector and a signal processor. The detector includes: a sensor chip having a surface; a first detection element disposed at the surface of the sensor chip; and a second detection element disposed at the surface of the sensor chip. The signal processor processes a signal input from the detector. The first detection element outputs a first detection signal corresponding to a position of a detection target, based on a change in a magnetic field received from the detection target. The second detection element outputs a second detection signal corresponding to the position of the detection target, based on the change in the magnetic field received from the detection target. A center of balance of the first detection element coincides with a center of balance of the second detection element.

10 Claims, 18 Drawing Sheets

(56) References Cited

U.S. PATENT DOCUMENTS

| | | | |
|---|---|---|---|
| 2006/0238190 | A1 | 10/2006 | Ishio |
| 2013/0335066 | A1* | 12/2013 | Cesaretti ............ G01R 33/0035 324/202 |
| 2015/0192433 | A1 | 7/2015 | Onodera et al. |
| 2016/0123774 | A1 | 5/2016 | Foletto et al. |
| 2017/0356759 | A1* | 12/2017 | David .................... G01D 5/142 |

FOREIGN PATENT DOCUMENTS

| | | |
|---|---|---|
| JP | 4466355 B2 | 5/2010 |
| JP | 5249156 B2 | 7/2013 |
| JP | 2015-108527 A | 6/2015 |
| WO | 2015/008439 A1 | 1/2015 |
| WO | 2018/230087 A1 | 12/2018 |
| WO | 2018/230242 A1 | 12/2018 |
| WO | 2018/230244 A1 | 12/2018 |

* cited by examiner

POSITION SENSOR

CROSS REFERENCE TO RELATED APPLICATIONS

The present application is a continuation application of International Patent Application No. PCT/JP2018/019060 filed on May 17, 2018, which designated the U.S. and claims the benefit of priority from Japanese Patent Application No. 2017-118778 filed on Jun. 16, 2017. The entire disclosures of all of the above applications are incorporated herein by reference.

TECHNICAL FIELD

The present disclosure relates to a position sensor

BACKGROUND

A detector may detect a movement of a detection target. The detector may include plural magnetic resistance elements and a processing circuit for processing output of each of the magnetic resistance elements. Each magnetic resistance element is included in a first set of magnetic resistance element pair and a second set of magnetic element pair, which are disposed at a position facing the detection target and are respectively formed as a half-bridge circuit.

A midpoint potential of each set of magnetic resistance element pairs changes with the movement of the detection target. The processing circuit outputs a binary signal, which is obtained through binarizing a differential output by comparing the differential output of the midpoint potential of each set of magnetic resistance element pairs with a threshold value.

SUMMARY

The present disclosure describes a position sensor, which outputs a signal corresponding to a position of a detection target.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
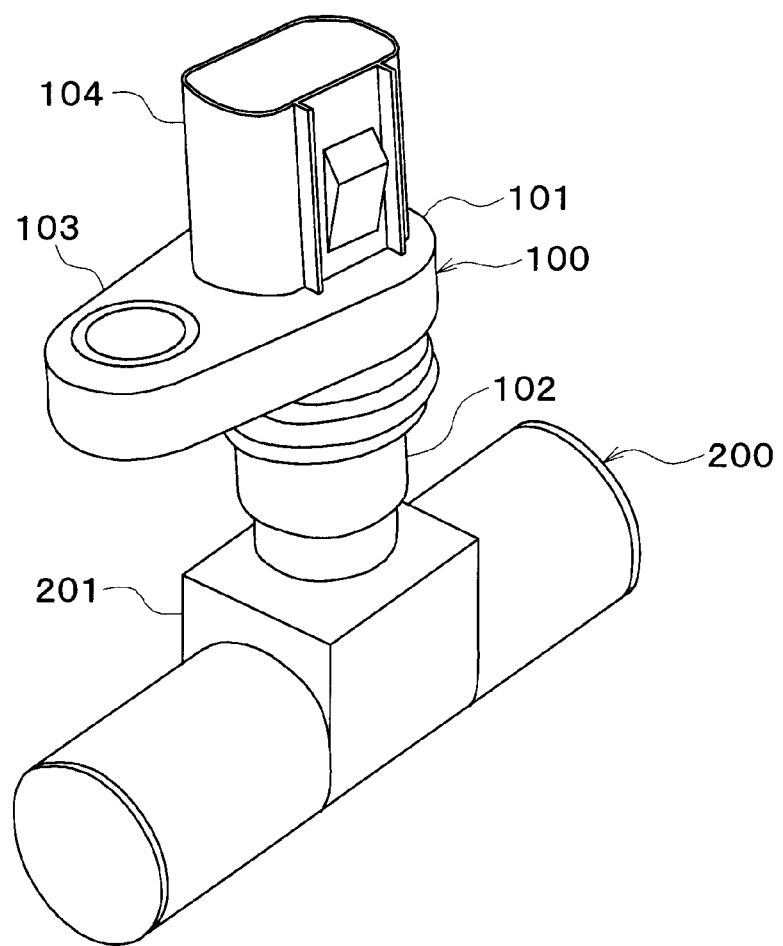
FIG. 1 is an appearance view of a position sensor according to a first embodiment of the present disclosure.

A dual system may be configured by using two sets of a device and a detection target. Since the size and cost may increase, it may be required to configure a dual system with a single detector without increasing the number of detection targets. If two magnetic resistance elements are disposed side by side at a sensor chip, signals of two-systems may be generated.

Since a direction of a magnetic field received by a magnetic resistance element provided at the sensor chip has an in-plane distribution, a phase difference of the signals occurs at the two-systems (or a dual system). Thus, an inter-system error in a detected position may occur in the two-systems. The inter-system error may be an error as a phase difference between two signals generated in the two-systems.

In one or more embodiments of the present disclosure, a position sensor may minimize the inter-system error in the detected position, even though a detector is a dual system.

A position sensor according to an aspect of the present disclosure includes a detector and a signal processor. The detector has a sensor chip, a first detection element and a second detection element. The sensor chip has a surface. The first detection element is disposed at the surface of the sensor chip, and the second detection element is disposed at the surface of the sensor chip. The signal processor processes a signal input from the detector.

The first detection element outputs the first detection signal corresponding to the position of the detection target, based on a change in magnetic field received from the detection target. The second detection element outputs the second detection signal corresponding to the position of the detection target, based on a change in a magnetic field received from the detection target. The center of balance of the first detection element coincides with the center of the second detection element.

Each detection signal is a signal reflecting an average of the change in the magnetic field at the center of balance of each detection element. Since the respective centers of balance of the detection elements coincide with each other, the respective averages of the change in the magnetic field received by the detection elements from the detection target are similar. Therefore, it may be possible that the detection elements generate the similar detection signals. Even though the detector is included in the dual system, it may be possible to eliminate the inter-system error in the detected position.

Hereinafter, embodiments of the present disclosure are described with reference to the drawings. In the following embodiments, identical or similar elements are denoted by the same reference numerals as each other in the figures.

First Embodiment

A first embodiment of the present disclosure will be described below with reference to the drawings. A position sensor according to the present embodiment detects a range (state), which covers the position of a detection target, and outputs a signal according to the range.

As illustrated in FIG. 1, a position sensor 100 detects the position of a shaft 200 in conjunction with an operation of a vehicle shift position as a detection target. Specifically, the position sensor 100 detects a signal based on the position of a protrusion part 201 on the shaft 200 to acquire the state of the shaft 200.

The state of the shaft 200 refers to the position of the shaft 200 when the shift position is operated by a user. For example, the shaft 200 is moved in conjunction with a parking position of the shift position. As illustrated in FIG. 1, when the shift position is operated to be the parking position, the shaft 200 is axially moved. The shaft 200 thus reflects the state of the parking position. The position sensor 100 detects the position of the shaft 200 right before the protrusion part 201.

When the shift position is operated to be a position other than the parking position, the shaft 200 reflects the state of that shift position other than the parking position. In this case, the position sensor 100 detects the position of the protrusion part 201 or the position of the shaft 200 right after the protrusion part 201. The shaft 200 may be moved in conjunction with a position other than the parking position.

The shaft 200 is made of, for example, a magnetic material. In the shaft 200, a surface of the protrusion part 201 opposing the position sensor 100 may be made of the magnetic material and other portions may be made of other metal materials.

The position sensor 100 includes a case 101 formed by molding a resin material such as Polyphenylene sulfide (PPS). The case 101 includes a distal end part 102 on a side of the shaft 200, a flange 103 fixed to a peripheral mechanism, and a connector 104 to which a harness is connected. A sensing part is disposed within the distal end part 102.

The position sensor 100 is fixed via the flange 103 to the peripheral mechanism so that the distal end part 102 has a predetermined gap to the protrusion part 201 of the shaft 200. Consequently, the shaft 200 moves with respect to the position sensor 100.

Although not illustrated, the position sensor 100 may be fixed to the peripheral mechanism so as to detect the position of a valve operating in conjunction with the shaft 200. The movement direction of the shaft 200 is not limited to a straight direction and a reciprocal direction. The shaft 200 may rotate or reciprocate at a specific angle. As described above, the position sensor 100 can be used to detect the state of a movable component moving in conjunction with the operation of the vehicle shift position such as movement and rotation.

Figure 2:
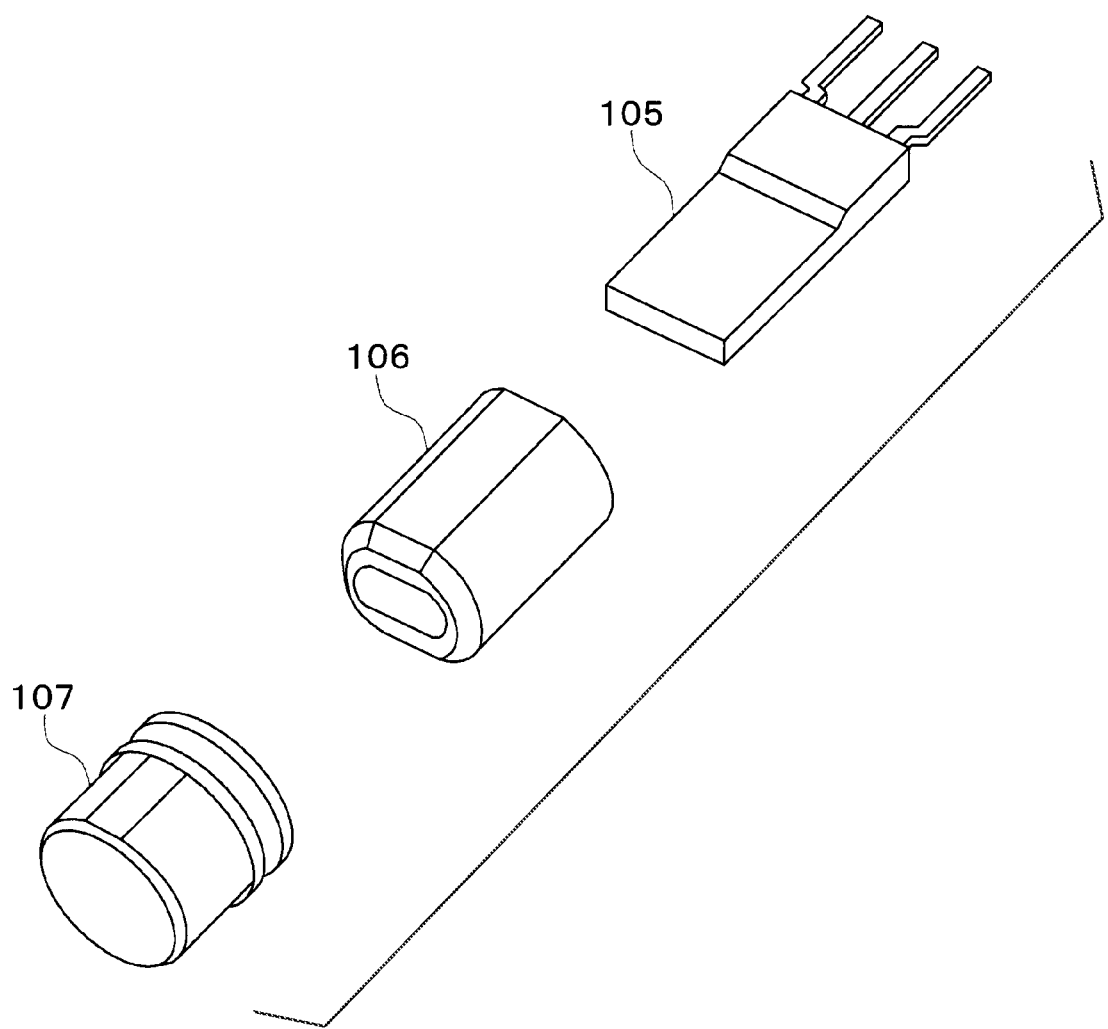
FIG. 2 is an exploded perspective view of components included in a magnetic detection system using a magnetic resistance element.

The position sensor 100 adopts a magnetic detection system using a magnetic resistance element. As illustrated in FIG. 2, in the case of the magnetic detection system using a magnetic resistance element, the position sensor 100 includes a mold IC 105, a magnet 106, and a holder 107. These components are housed in the distal end part 102 of the case 101. The mold IC 105 is inserted into the magnet 106 formed in a hollow cylindrical shape. The magnet 106 is inserted into the holder 107 formed in a cylindrical shape with a bottom.

Figure 3:
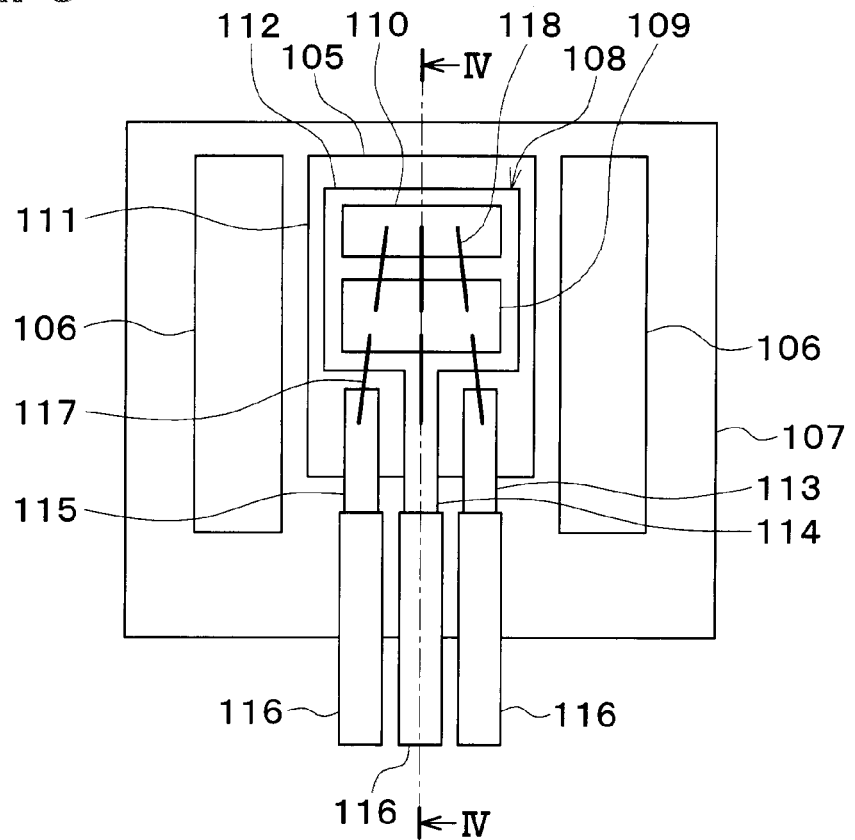
FIG. 3 is a plan view of the respective components illustrated in FIG. 2.
Figure 4:
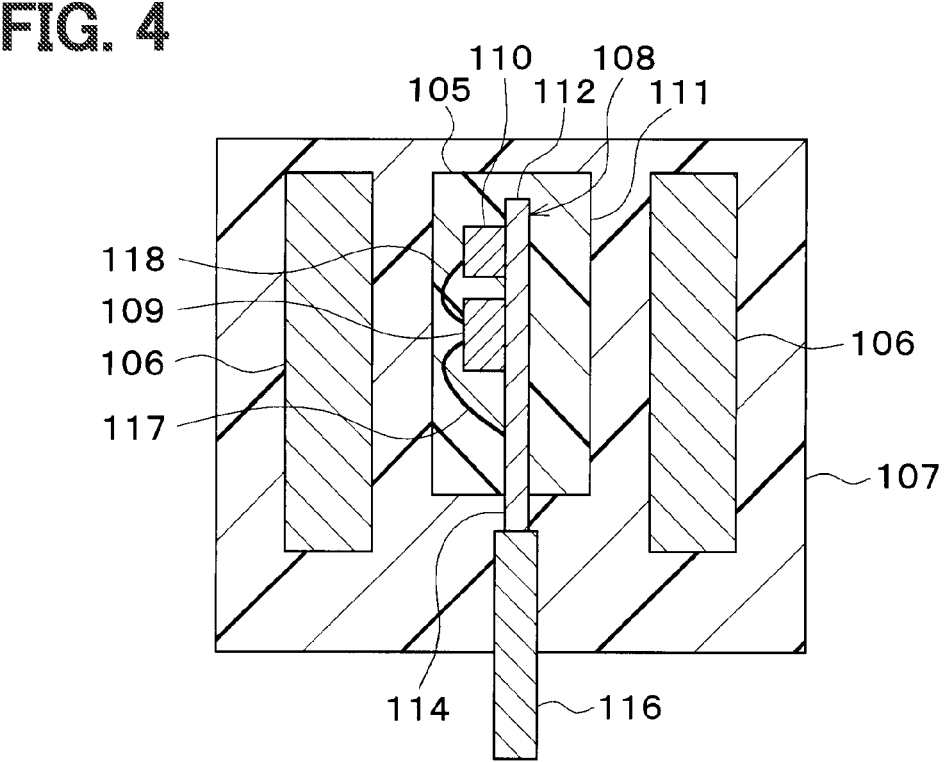
FIG. 4 is a cross-sectional view taken along a line IV-IV of FIG. 3.

As illustrated in a schematic plan view of FIG. 3 and a schematic cross-sectional view of FIG. 4, the mold IC 105, the magnet 106, and the holder 107 are integrated with each other. The main part of the mold IC 105 is disposed in a hollow part of the magnet 106. The holder 107 fixes the positions of the mold IC 105 and the magnet 106.

The mold IC 105 includes a lead frame 108, a processing circuit chip 109, a sensor chip 110, and a mold resin 111. The lead frame 108 includes a plate-like island 112 and plural leads 113 to 115. The island 112 is disposed so that a flat surface of the island 112 is vertical to the movement direction of a detection target.

The leads 113 to 115 include a power supply terminal 113 to which a power supply voltage is applied, a ground terminal 114 to which a ground voltage is applied, and an output terminal 115 for outputting a signal. That is, the leads 113 to 115 are three leads for a power supply, ground, and a signal, respectively. A terminal 116 is connected to a distal end of each of the leads 113 to 115. The terminal 116 is disposed in the connector 104 of the case 101. The terminal 116 is also connected to a harness.

In the present embodiment, the ground lead 114 of the leads 113 to 115 is integrated with the island 112. The island 112 may be completely separated from all the leads 113 to 115.

The processing circuit chip 109 and the sensor chip 110 are mounted on the island 112 by adhesive or the like. The processing circuit chip 109 includes a circuit unit that processes signals from the sensor chip 110. The sensor chip 110 includes a magnetic resistance element whose resistance value changes when being externally affected by a magnetic field. The magnetic resistance element is, for example, AMR, GMR, or TMR. The leads 113 to 115 are electrically connected via wires 117 to the processing circuit chip 109. The processing circuit chip 109 is electrically connected via wires 118 to the sensor chip 110.

The mold resin 111 seals the island 112, parts of the leads 113 to 115, the processing circuit chip 109, and the sensor chip 110. The mold resin 111 is molded in a shape fixed in the hollow part of the magnet 106.

Figure 5:
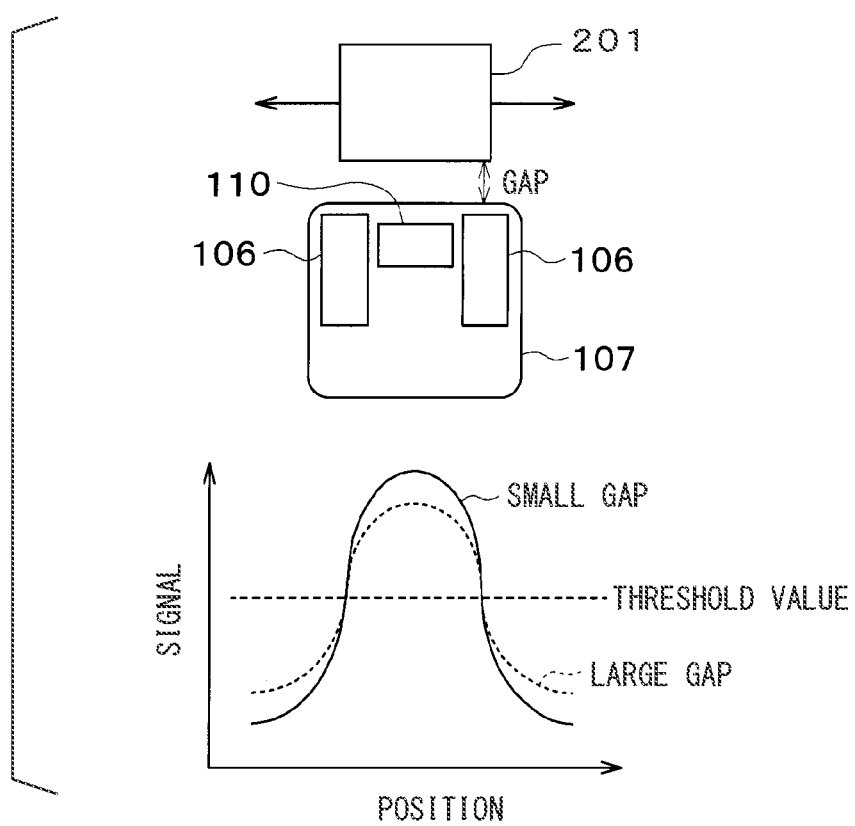
FIG. 5 illustrates a detection signal from the magnetic resistance element.

A detection signal generated by the magnetic detection system using a magnetic resistance element is described. As illustrated in FIG. 5, the holder 107 is disposed with a predetermined gap to the protrusion part 201 that is a detection target. When the protrusion part 201 moves relative to the holder 107, a detection signal is maximized at the center in the movement direction of the protrusion part 201. As the gap increases, the amplitude of the detection signal decreases. As the gap decreases, the amplitude of the detection signal increases. It may be possible to detect the position of the protrusion part 201 by setting a threshold of the detection signal.

FIG. 5 illustrates only the relationship between the movement of the protrusion part 201 and a detection signal from a magnetic detection element. The detection signal is generated by outputs of plural magnetic resistance elements, which is described later.

In a magnetic detection system using the magnetic resistance element, the magnetic resistance element detects a magnetic vector having an effect of being capable of cancelling a precision error due to a variation in gap. In addition, the magnetic resistance element also has an effect of being capable of reducing or cancelling the effect of stress generated in the sensor chip 110. Thus, it may be possible to achieve detection with higher precision.

Figure 6:
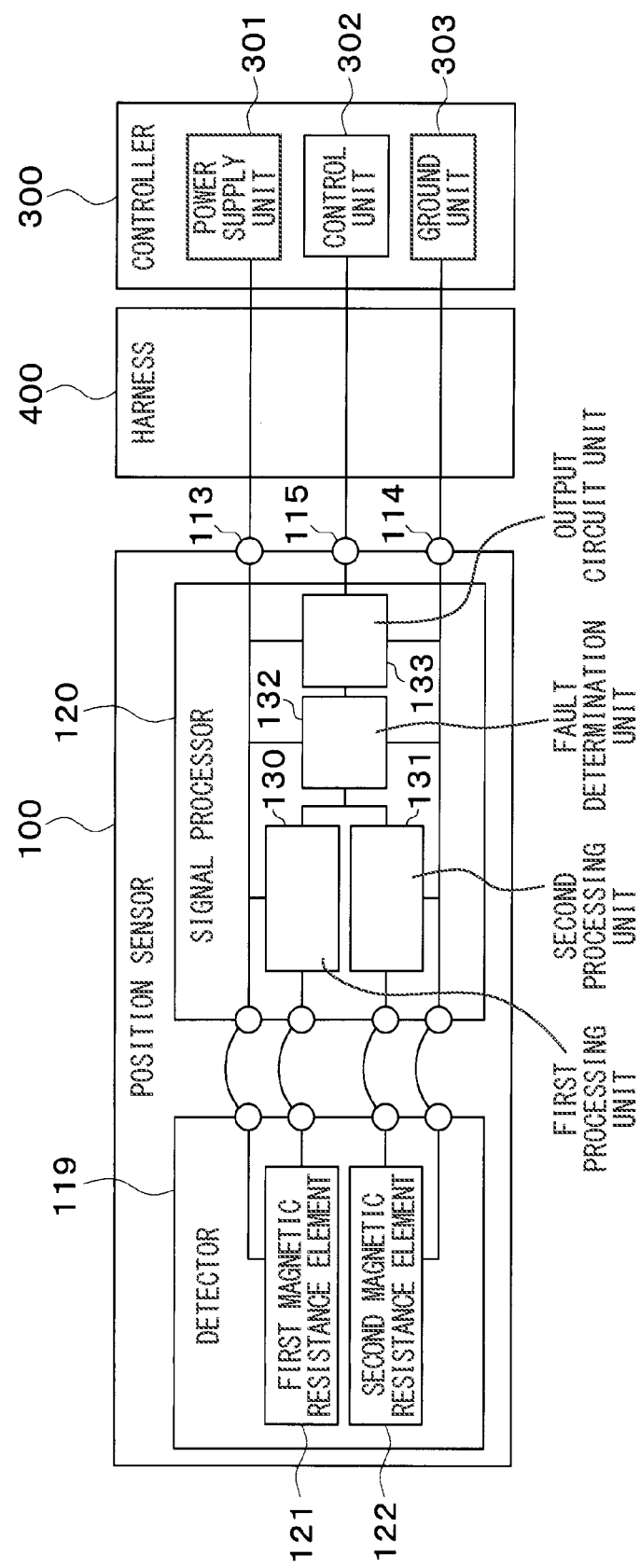
FIG. 6 is a diagram illustrating a circuit configuration of a position sensor.

Next, a circuit configuration in the sensor chip 110 and the processing circuit chip 109 is described. As illustrated in FIG. 6, the position sensor 100 is electrically connected via a harness 400 to a controller 300. As the mold IC 105 has three leads 113 to 115 as described above, the harness 400 includes three wires.

The controller 300 is, for example, a transmission control unit (TCU). The controller 300 includes a power supply unit 301, a control unit 302, and a ground unit 303. The power supply unit 301 is a circuit unit that supplies a power supply voltage to the position sensor 100. The control unit 302 is a circuit unit that executes predetermined control according to an output signal input from the position sensor 100. The ground unit 303 is a circuit unit that sets a ground voltage of the position sensor 100. The controller 300 may be configured as an electronic control unit (ECU).

The position sensor 100 includes a detector 119 and a signal processor 120. The detector 122 is disposed in the sensor chip 110. The signal processor 120 is disposed in the processing circuit chip 109. The detector 119 and the signal processor 120 operate based on a power supply voltage and a ground voltage supplied from the controller 300.

The detector 119 includes a first magnetic resistance element 121 and a second magnetic resistance element 122. The first magnetic resistance element 121 outputs a first detection signal according to the position of the protrusion part 201. The second magnetic resistance element 122 outputs a second detection signal according to the position of the protrusion part 201.

Each of the magnetic resistance elements 121, 122 includes three sets of element pairs, that is, a first set of magnetic resistance element pair, a second set of magnetic resistance element pair, and a third set of magnetic resistance element pair whose resistance values change depending on the movement of the protrusion part 201.

The first magnetic resistance element pair, the second magnetic resistance element pair, and the third magnetic resistance element pair are disposed so that the second magnetic resistance element pair is disposed between the first magnetic resistance element pair and the third magnetic resistance element pair in the movement direction of the protrusion part 201. The second magnetic resistance element pair is disposed to be sandwiched between the first magnetic resistance element pair and the third magnetic resistance element pair. A bias magnetic field is applied to the second magnetic resistance element pair along the central axis of the magnet 106. A bias magnetic field is applied to the first magnetic resistance element pair and the third magnetic resistance element pair so as to surround ends of the magnet 106.

Figure 7:
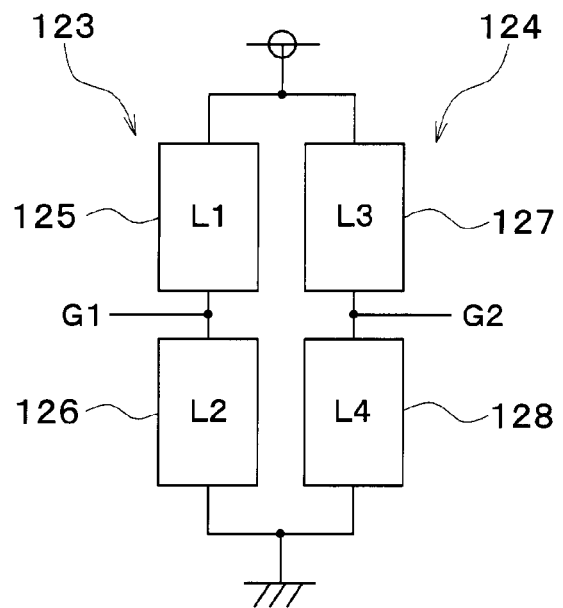
FIG. 7 illustrates an equivalent circuit of a first set of magnetic resistance element pair.

Each set of the magnetic resistance element pairs is a half-bridge circuit in which two magnetic resistance elements are serially connected between a power supply and a ground. In particular, as illustrated in FIG. 7, the first magnetic resistance element pair includes: a first half-bridge circuit 123 included in a part of the first magnetic resistance element 121; and a second half-bridge circuit 124 included in a part of the second magnetic resistance element 122.

Two resistance portions 125, 126 (L1, L2) are connected in series in the first half-bridge circuit 123. Each of the resistance portions 125, 126 has a resistance value varied with a movement of the protrusion part 201, in a situation where two resistance portions 125, 126 are affected by a magnetic field. The first half-bridge circuit 123 outputs a voltage G1, as a waveform signal, at a midpoint between the two resistance portions 125, 126, based on a change in the resistance value. The voltage G1 is one of signals of the first system in a dual system.

Two resistance portions 127, 128 (L3, L4) are connected in series in the second half-bridge circuit 124. As similar to the above, the second half-bridge circuit 124 outputs a voltage G2, as a waveform signal, at a midpoint between the two resistance portions 127, 128, based on a change in the resistance value of each of the resistance portions 127, 128. The voltage G2 is one of the signals of the second system in the dual system.

Figure 8:
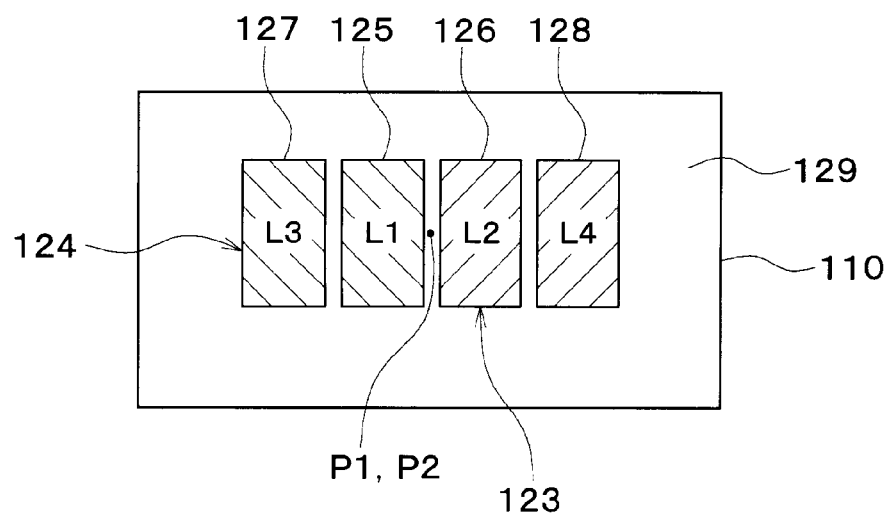
FIG. 8 is a plan view illustrating respective layouts of resistance portions of half-bridge circuits.

As shown in FIG. 8, the half-bridge circuits 123 and 124 are disposed on the one surface 129 of the sensor chip 110 so that the respective centers of balance of the wiring patterns coincide with each other. Disposing the half-bridge circuits 123, 124 on the one surface 129 of the sensor chip 110 does not only refer to a situation of disposing directly the half-bridge circuits 123, 124 on the one surface 129 of the sensor chip 110. The half-bridge circuits 123, 124 may also be disposed on a protective film formed on the one surface 129.

In the present embodiment, the wiring pattern of the second half-bridge circuit 124 has a layout to sandwich the wiring pattern of the first half-bridge circuit 123 on the one surface 129 of the sensor chip 110. In particular, the first half-bridge circuit 123 has a layout such that the resistance portions 125, 126 are adjacent to each other. The wiring pattern of each of the resistance portions 125, 126 is formed, for example, in a quadrilateral region, and the linear portion of the wiring is formed in a line-symmetric form so as to follow oblique lines in FIG. 8. The center of balance of the wiring pattern of the first half-bridge circuit 123 is P1 in FIG. 8.

The resistance portions 127, 128 of the second half-bridge circuit 124 respectively have layouts to be disposed separately from each other. The resistance portions 125, 126 of the first half-bridge circuit 123 are sandwiched between the resistance portions 127, 128. The wiring pattern of each of the resistance portions 127, 128 is formed, for example, in a rectangular region, and the linear portion of the wiring is formed in a line-symmetric form so as to follow the oblique lines in FIG. 8. The center of balance of the wiring pattern of the second half-bridge circuit 124 is P2 in FIG. 8.

The center of balance of the wiring pattern of the first half-bridge circuit 123 on the one surface 129 of the sensor chip 110 coincides with the center of balance of the wiring pattern of the second half-bridge 124 on the one surface 129 of the sensor chip 110. The center of balance, such as the center of a layout, the centroid of an area, or the centroid of a wiring pattern, is a position where the balance of the resistance portions 125, 126 and the balance of the resistance portions 127, 128 coincide with each other. Even though the resistance portions 127, 128 are separated in the second half bridge circuit 124, the positions of the resistance portions 127 and 128 and the center position of the balance are not related to each other.

According to the above configuration, an average of a magnetic field directional change received by the resistance portions 125, 126 of the first half-bridge circuit 123 is a change in the voltage G1. The change in the voltage G1 is a signal reflecting the magnetic field directional change at the center of balance of the wiring pattern of the first half-bridge circuit 123. Similarly, the average of the magnetic field directional change received by the resistance portions 127, 128 of the second half-bridge circuit 124 is a change in the voltage G2. The change in the voltage G2 is a signal reflecting the change in the magnetic directional change at the center of balance of the wiring pattern on the second half-bridge circuit 124.

Figure 9:
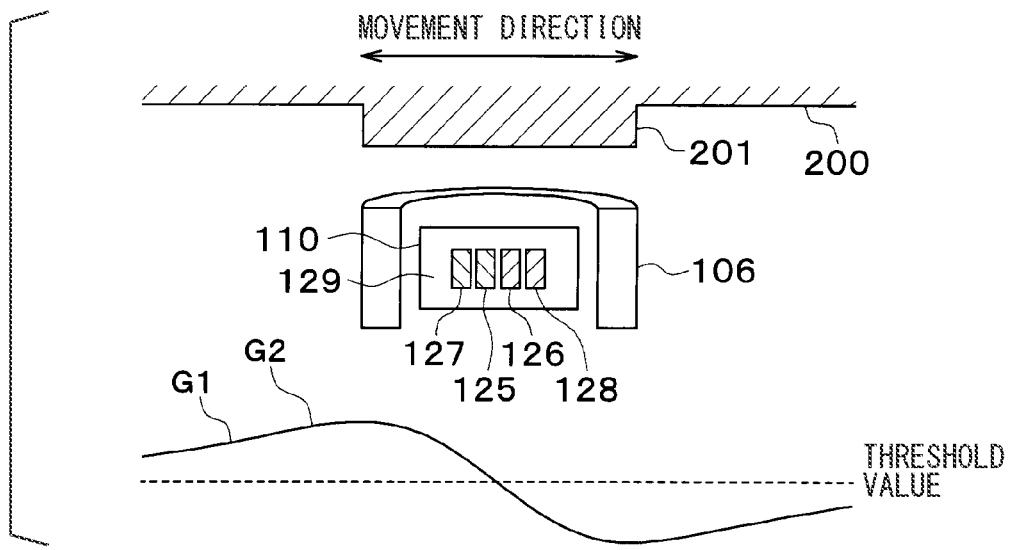
FIG. 9 illustrates output respective voltages G1, G2 of the half-bridge circuits.

The first set of magnetic resistance element pair detects a change in the respective resistance values of the resistance portions 125, 126 and the respective resistance values of the resistance portions 127, 128, in a situation of the influence of a magnetic field with the movement of the protrusion part 201. The first set of magnetic resistance element pair outputs the voltages G1, G2 at the midpoints of the half-bridge circuits 123, 124, based on a change in the resistance values. As illustrated in FIG. 9, the signal G1 output by the first half-bridge circuit 123 and the signal G2 output by the second half-bridge circuit 124 are exactly the similar waveform signals. In other words, an offset does not exist between the signals G1 and G2

Similarly, the second and third sets of magnetic resistance element pairs are configured by half-bridge circuits 123, 124, which are included in the dual system. In other words, the second set of magnetic resistance element pair is also configured by the first half-bridge circuit 123 and the second half-bridge circuit 124. The similar situation applies to the third set of magnetic resistance element pair. The first magnetic resistance element 121 has three sets of element pairs, and includes three first half-bridge circuits 123 respectively included in the element pairs. Similarly, the second magnetic resistance element 122 includes three sets of element pairs, and includes three second half-bridge circuit 124 respectively included in the element pairs. FIG. 9 illustrates only the first set of magnetic resistance element pair at the sensor chip 110. In fact, three sets of element pairs are disposed at the sensor chip 110.

Each of the magnetic resistance elements 121, 122 includes first to fourth operational amplifiers. Each operational amplifier is disposed at each of the magnetic resistance elements 121, 122.

With regard to the first magnetic resistance element 121, it is assumed that: the midpoint potential of the first half-bridge circuit 123 in the first set of magnetic resistance element pair is V1; the midpoint potential of the first half-bridge circuit 123 in the second set of magnetic resistance element pair is V2; and the midpoint potential of the first half-bridge circuit 123 in the third set of magnetic resistance element pair is V3.

The first operational amplifier is a differential amplifier configured to calculate (V1−V2) and output the result as R1. The second operational amplifier is a differential amplifier configured to calculate (V2−V3) and output the result as R2.

The third operational amplifier is a differential amplifier configured to calculate (V1−V3) and output the result as S1. For example, the signal S1 has a waveform whose amplitude is maximized at the center in the movement direction of the protrusion part 201 on the shaft 200 and is minimized as being away from the protrusion part 201.

The fourth operational amplifier is a differential amplifier configured to input R1 (=V1−V2) from the first operational amplifier, input from R2 (=V2−V3) from the second operational amplifier, calculate R2−R1, and output the result as S2 (=(V2−V3)−(V1−V2)). The signal S2 has a waveform according to a recess and projection structure of the protrusion part 201 on the shaft 200. For example, the signal S2 has a waveform whose amplitude is maximized at one edge portion of the protrusion part 201 on the shaft 200 where a recess changes to a projection and is minimized at the other edge portion of the protrusion part 201 on the shaft 200 where the projection changes to the recess. The signal S2 has a waveform with a phase difference from the signal S1. The first magnetic resistance element 121 outputs the signals S1 and S2 as the first detection signal to the signal processor 120.

Similarly, the second magnetic resistance element 122 generates and acquires the signal S1 (=V1−V3) and the signal S2 (=(V2−V3)−(V1−V2)). The second magnetic resistance element 122 outputs the signals S1 and S2 as the second detection signal to the signal processor 120.

Each operational amplifier may also be disposed at the signal processor 120. In other words, each detection signal may be acquired by the signal processor 120.

The signal processor 120 illustrated in FIG. 6 is a circuit that processes signals input from the detector 119. The signal processor 120 includes a first processing unit 130, a second processing unit 131, a fault determination unit 132, and an output circuit unit 133.

The first processing unit 130 receives an input of the first detection signal from the first magnetic resistance element 121, and specifies a position of the protrusion part 201 based on the first detection signal. The second processing unit 131 receives an input of the second detection signal from the second magnetic resistance element 122, and specifies the position of the protrusion part 201 based on the second detection signal. Each of the processing units 130, 131 includes a threshold value for a detection signal.

The processing units 130, 131 compare the signals S1, S2 with the threshold value. If the signals S1 and S2 are larger than the threshold, the processing units 130, 131 determine such a state as Hi. On the other hand, if the signals S1 and S2 are smaller than the threshold, the processing units 129, 130 determine such a state as Lo. In addition, the processing units 130, 131 determine the range of the shaft 200 detected by the magnetic resistance elements 121, 122 based on a Hi/Lo combination of the signals S1 and S2.

Figure 10:
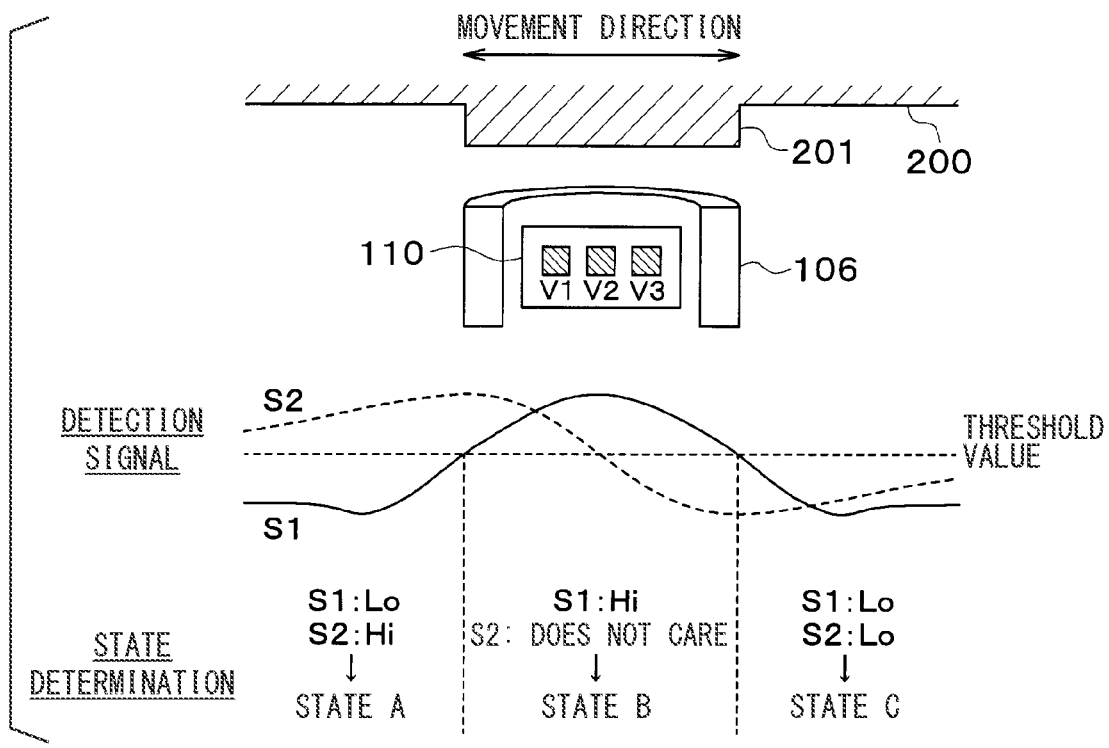
FIG. 10 illustrates a detection signal and state determination in a situation of detecting three states.

Specifically, when the signal S1 is Lo and the signal S2 is Hi as illustrated in FIG. 10, the magnetic resistance elements 121, 122 detect the shaft 200 on the left side of the protrusion part 201 on the drawing. That is, the processing units 130, 131 specify the position of the shaft 200. The state of the shaft 200 when a position in such a range is specified is referred to as "state A".

Similarly, when the signal S1 is Hi, the magnetic resistance elements 121, 122 detect the protrusion part 201 on the shaft 200. In this case, it does not matter whether the signal S2 is Hi or Lo. The state of the shaft 200 when a position in such a range is specified is referred to as "state B".

When the signal S1 is Lo and the signal S2 is also Lo, the magnetic resistance elements 121, 122 detect the shaft 200 on the right side of the protrusion part 201 on the drawing. The state of the shaft 200 when a position in such a range is specified is referred to as "state C". As described above, the processing units 130, 131 specify the position of the shaft 200 as a position in one of the ranges in the movement direction of the shaft 200.

The first magnetic resistance element 121 and the first processing unit 130 are included in a first system. The second magnetic resistance element 122 and the second processing unit 131 are included in a second system.

The processing units 130, 131 output a signal with a value corresponding to a range, which covers a specified position, among discrete values set in plural ranges to the fault determination unit 132. Signals with the discrete values are, for example, voltage signals with different voltage values or pulse signals with different pulse widths.

The fault determination unit 132 is a circuit unit that determines whether the position specified by the first processing unit 129 matches the position specified by the second processing unit 130. The positions specified by the processing units 130, 131 are in any of the states A to C described above. The fault determination unit 132 thus determines whether the states specified by the respective processing units 130, 131 match. The fault determination unit 132 outputs a result of the fault determination to the output circuit unit 133.

The output circuit unit 133 controls a signal to be output to the controller 300 based on a determination result of the fault determination unit 132. When the fault determination unit 132 determines that the positions match, the output circuit unit 133 outputs a position signal corresponding to the position matched to the output terminal 115. When the fault determination unit 132 determines that the positions do not match, the output circuit unit 133 outputs a fault signal corresponding to a fault to the output terminal 115. The configuration of the position sensor 100 according to the present embodiment is described above.

Figure 11:
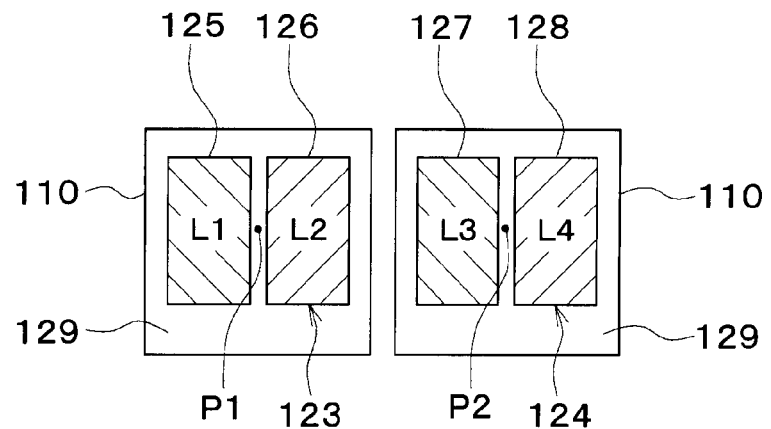
FIG. 11 illustrates a comparative example in which each system is provided in a separate sensor chip.

As illustrated in FIG. 11, in a comparative example, the systems are disposed in separate sensor chips 110. In this configuration, the first half-bridge circuit in the first system is disposed at a first sensor chip 110. The center of balance of the wiring pattern of the first half-bridge circuit 124 is P1 in FIG. 11. The second half-bridge 124 in the second system is disposed at a second sensor chip 110. The center of balance of the wiring pattern of the second half-bridge circuit 124 is P2 in FIG. 11. The equivalent circuit is similar to the one illustrated in FIG. 7.

Figure 12:
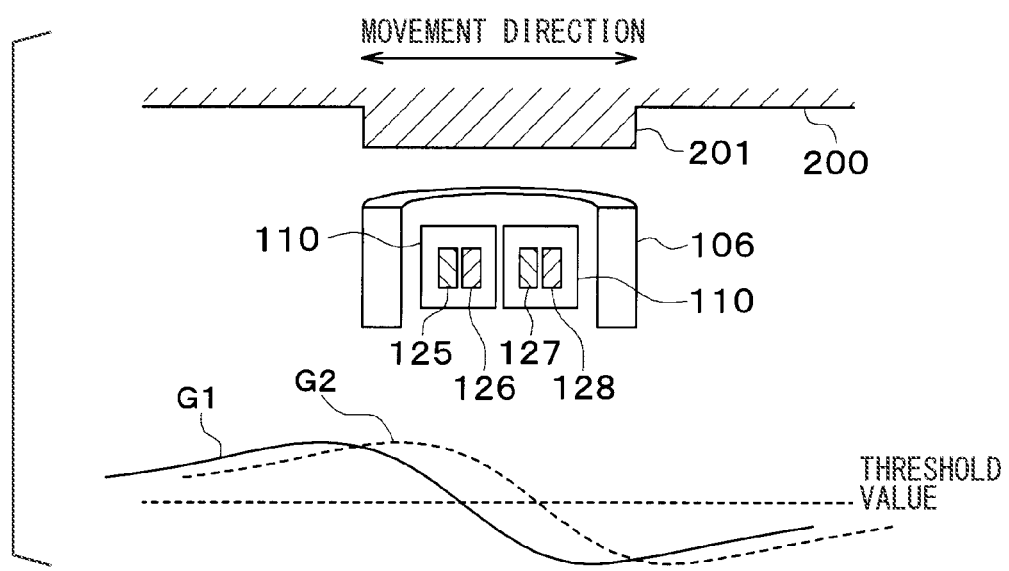
FIG. 12 illustrates output the respective voltages G1, G2 of the half-bridge circuits in a configuration in FIG. 11.

When the center of balance of wiring pattern of the half-bridge circuit 123 and the center of balance of wiring pattern of the half-bridge circuit 124 do not coincide with each other, a phase difference occurs between the voltage G1 of the half-bridge 123 and the voltage G2 of the half-bridge 124, as illustrated in FIG. 12.

Figure 13:
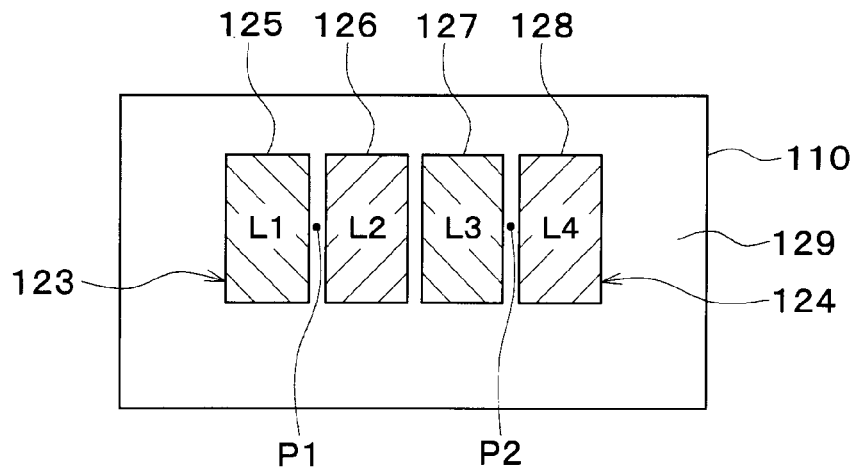
FIG. 13 illustrates a comparative example in which each system is provided in one sensor chip.
Figure 14:
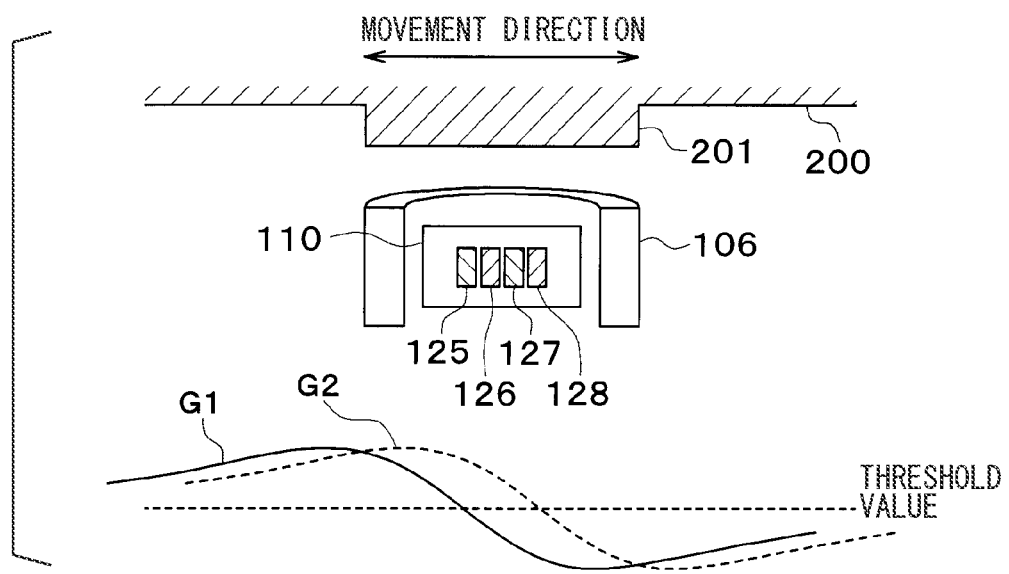
FIG. 14 illustrates output the respective voltages G1, G2 of the half-bridge circuits in a configuration in FIG. 13.

In another comparative example, the half-bridge circuits 123, 124 are disposed at a single sensor chip 110, as illustrated in FIG. 13. However, the resistance portions 125, 126 of the first half-bridge circuit 123 are arranged to be adjacent to each other. The resistance portions 127, 128 of the second half-bridge circuit 124 are arranged to be adjacent to each other. Therefore, the center of balance of the wiring pattern of the half-bridge circuit 123 and the center of balance of the wiring pattern of the half-bridge circuit 124 do not coincide with each other. In this situation, a phase difference occurs between the voltage G1 of the half-bridge circuit 123 and the voltage G2 of the half-bridge circuit 124, as shown in FIG. 14.

In the respective comparative examples shown in FIGS. 11 to 14, an inter-system error in the signals occurs, and a positional detection error occurs in the inter-system. Therefore, the similar positions cannot be detected, even if the dual system is provided.

In contrast to such a comparative example, in the present embodiment, the center of balance of the wiring pattern of the half-bridge circuit 123 and the center of balance of the wiring pattern of the half-bridge circuit 124 coincide with each other. Therefore, the respective averages of change in the magnetic fields received by the magnetic resistance elements 121, 122 from the shaft 200 coincide with each other. It may be possible to generate the similar detection signals in the systems. Even though the detector 119 is the dual system, it may be possible to eliminate the inter-system error in the detected position. The inter-system error does not occur in the detection signals, and the positional detection error does not occur between the systems. Therefore, it may be possible to detect the similar positions through each of the systems in the dual system.

Figure 15:
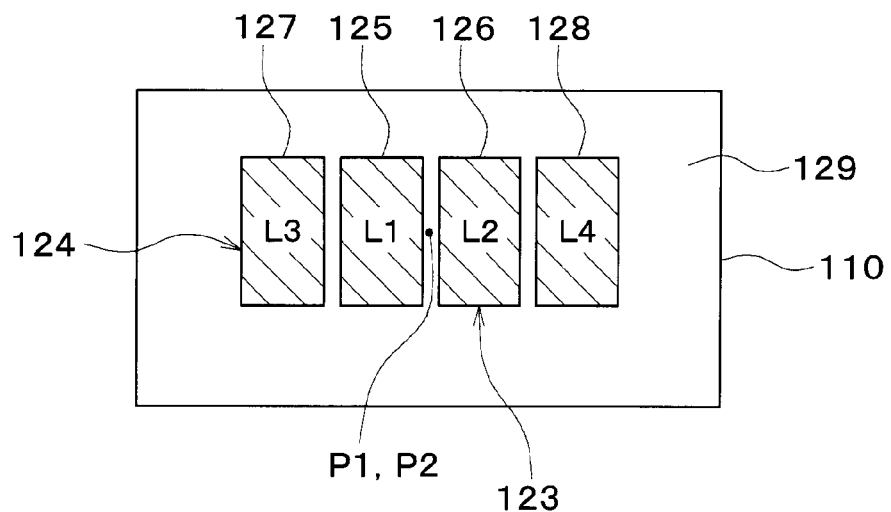
FIG. 15 illustrates a modified example in which respective wiring patterns of all of the resistance portions are formed in a similar manner.

In a modified example, as illustrated in FIG. 15, the resistance portions 125, 126 of the first half-bridge circuit 123 may be formed such that the linear portion of wiring follows an oblique line in FIG. 15. The similar situation applies to the resistance portions 127, 128 of the second half-bridge circuit 124.

Figure 16:
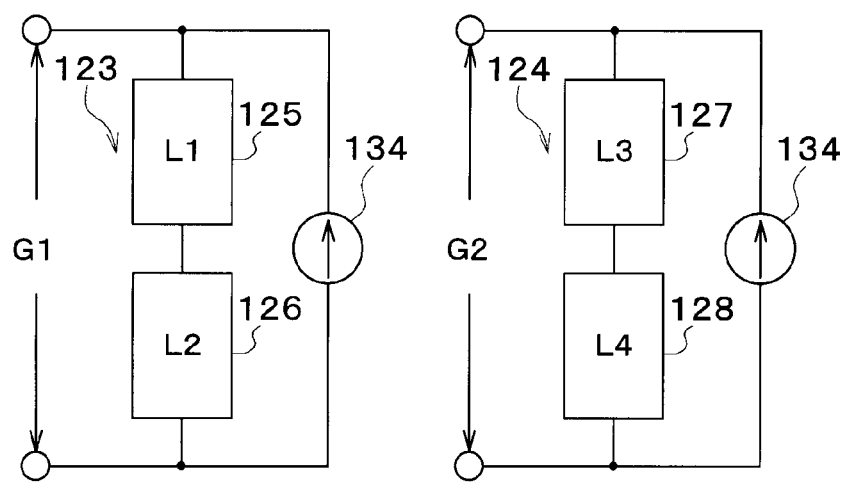
FIG. 16 illustrates a modified example in which each of the half-bridge circuits is driven by a current source.

In a modified example as illustrated in FIG. 16, the first half-bridge circuit 123 is operated by a current source 134. In this situation, the voltage G1 across both ends of the first half-bridge circuit 123 is output. The similar situation applies to the second half-bridge circuit 124.

Figure 17:
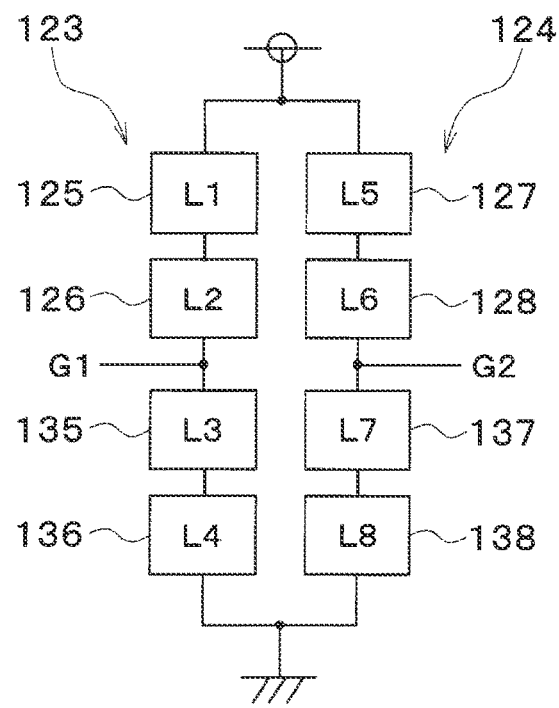
FIG. 17 illustrates a modified example in which each of the half-bridge circuits includes four resistance portions.

In a modified example as illustrated in FIG. 17, four resistance portions 125, 126, 135, 136 (L1 to L4) may be connected in series in the first half-bridge circuit 123, and four resistance portions 127, 128, 137, 138 (L5 to L8) may be connected in series in the second half-bridge circuit 124. In this situation, the first half-bridge circuit 123 outputs the voltage G1 at a connection part between the resistance portions 126 and 135. The second half-bridge circuit 124 outputs the voltage G2 at a connection part between the resistance portions 128 and 137.

Figure 18:
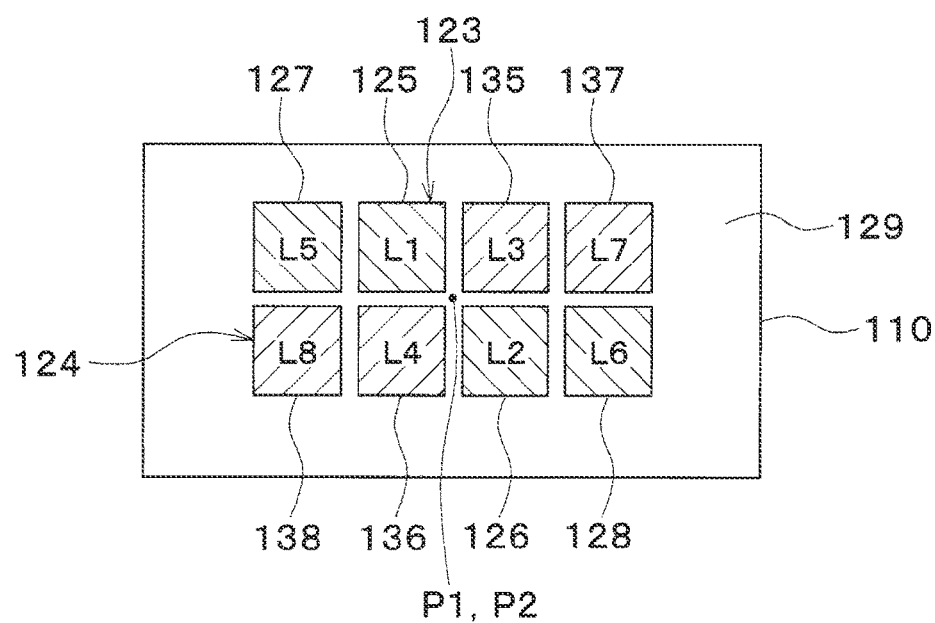
FIG. 18 illustrates the respective layouts of the resistance portions shown in FIG. 17.

In this situation, as illustrated in FIG. 18, the resistance portions 125, 126, 135, 136 of the first half-bridge circuit 123 are disposed in a cross shape. For example, the resistance portion 126 (L2) is disposed at a diagonal position of the resistance portion 125 (L1). Similarly, the resistance portion 136 (L4) is disposed at a diagonal position of the resistance portion 135 (L3). The resistance portions 135, 136 are disposed to be adjacent to the resistance portions 125, 126. The direction of the wiring pattern is also in a cross shape. The center of balance of each of the wiring patterns of four resistance portions 125, 126, 135, 136 is at P1 in FIG. 18.

The resistance portions 127, 128, 137, 138 of the second half-bridge circuit 124 are disposed to be in a cross shape as described above. However, the resistance portions 127, 138 and the resistance portions 137, 128 are disposed to be apart from each other. The center of balance of each of the wiring patterns of four resistance portions 127, 128, 137, 138 is at P2 in FIG. 18, and coincides with the center of balance of the wiring pattern of the first half-bridge circuit 123. When the wiring pattern of each of the half-bridge circuits 123, 124 are divided into several portions, an applied force received by each of the resistance portions 125 to 128, 135 to 138 from the sensor chip 110 may be reduced or cancelled. The number of resistance portions for each of the half-bridge circuits 123, 124 may be properly designed.

Figure 19:
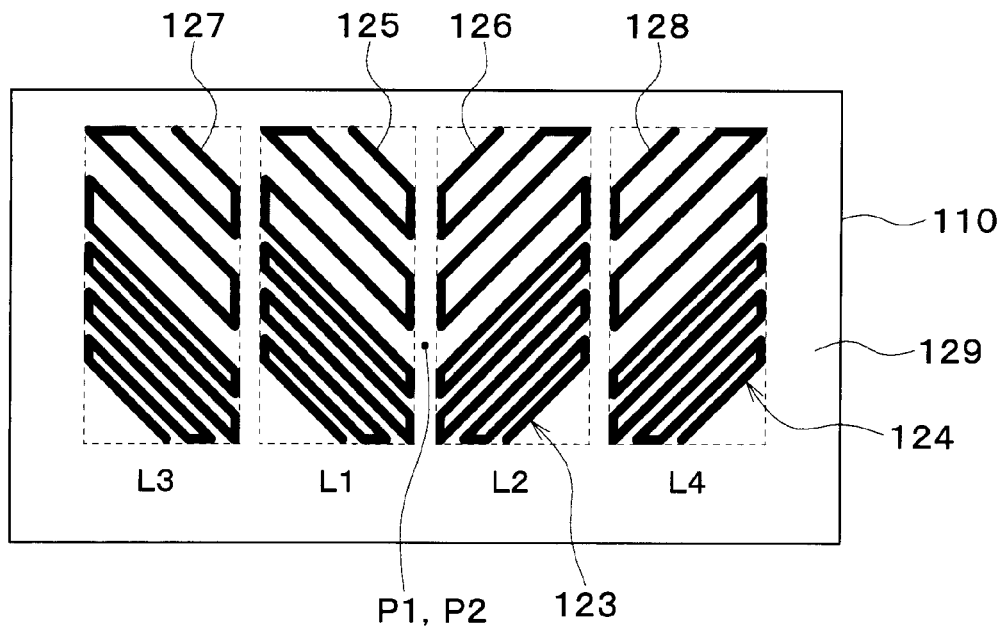
FIG. 19 illustrates a modified example in which the respective wiring patterns of the resistance portions are unevenly formed.
Figure 20:
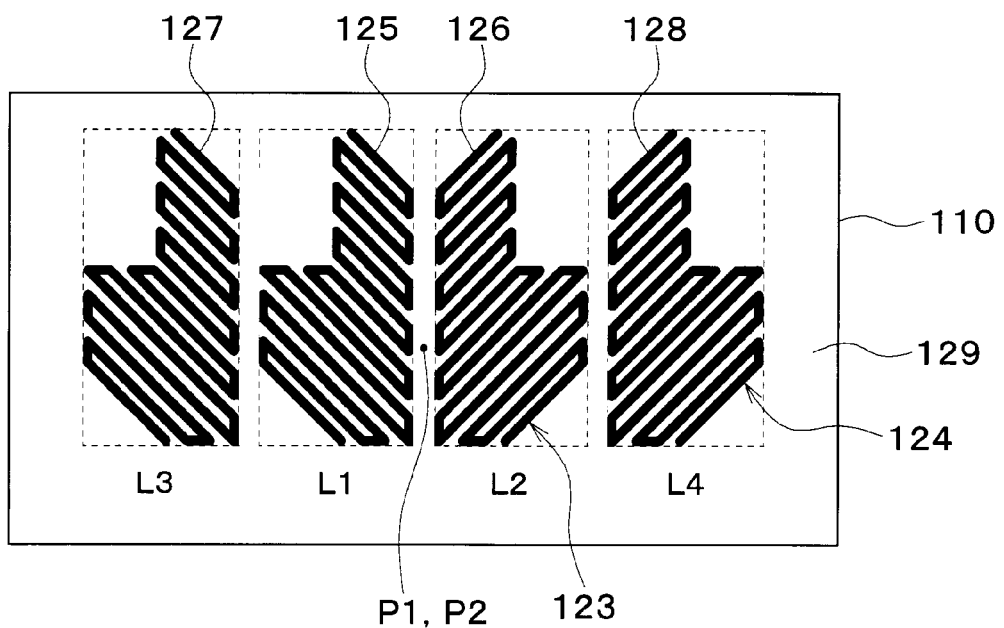
FIG. 20 illustrates a modified example in which the respective wiring patterns of the resistance portions are unevenly formed.

In a modified example as shown in FIGS. 19, 20, the wiring pattern of each of the half-bridge circuits 123, 124 may be formed unevenly. Even in this case, the center of balance of the wiring pattern of the half-bridge circuit 123 and the center of balance of the wiring pattern of the half-bridge circuit 124 coincide with each other. In a situation where the wiring patterns are unevenly formed, it may be designed such that the centroids of the respective areas of the wiring patterns coincide with each other. As illustrated in FIG. 20, it may be possible to dispose an element such as a transistor at the wiring pattern, by designing the wiring pattern in a predetermined region as provided.

Figure 21:
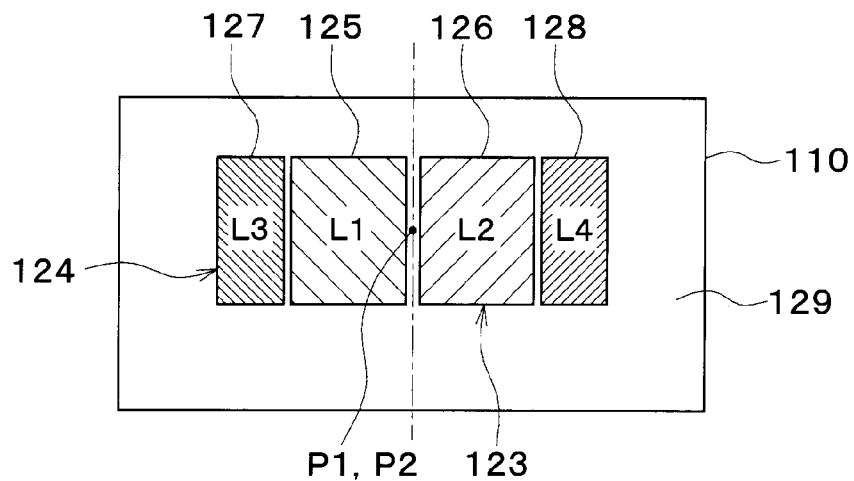
FIG. 21 illustrates a modified example in which the respective wiring patterns of the resistance portions are formed in a line-symmetric form.

In a modified example as illustrated in FIG. 21, the respective wiring patterns of the half-bridge circuits 123, 124 may be formed in a line-symmetric arrangement. For example, the resistance portions 125, 126 of the first half-bridge circuit 123 are formed in a wider region, and the resistance portions 127, 128 of the second half-bridge circuit 124 is formed at a narrower region.

Figure 22:
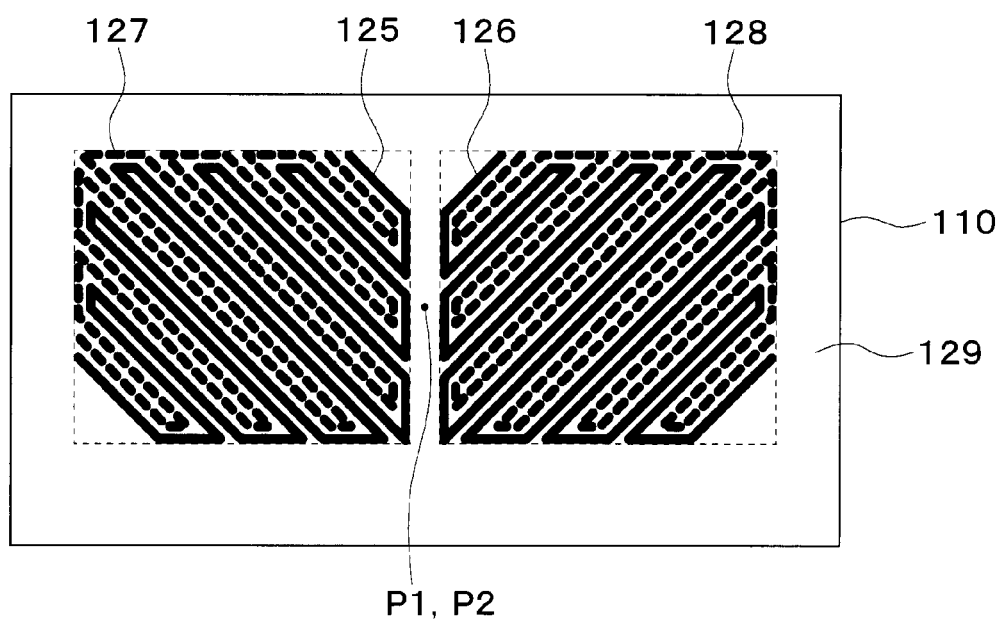
FIG. 22 illustrates a modified example in which the respective wiring patterns of the resistance portions are formed in a coexisting state.

In a modified example as illustrated in FIG. 22, the wiring pattern of the first half-bridge circuit 123 and the wiring pattern of the second half-bridge circuit 124 may coexist on the one surface 129 of the sensor chip 110. Even in such a situation, the center of balance of the wiring pattern of the half-bridge circuit 123 and the center of balance of the wiring pattern of the half-bridge circuit 124 may coincide to each other.

The shaft 200 corresponds to a detection target. Each of the magnetic resistance elements 121, 122 corresponds to a detection element.

Second Embodiment

Figure 23:
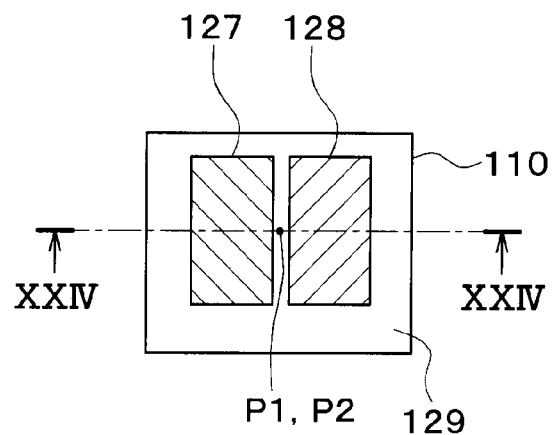
FIG. 23 is a plan view of a sensor chip according to a second embodiment.
Figure 24:
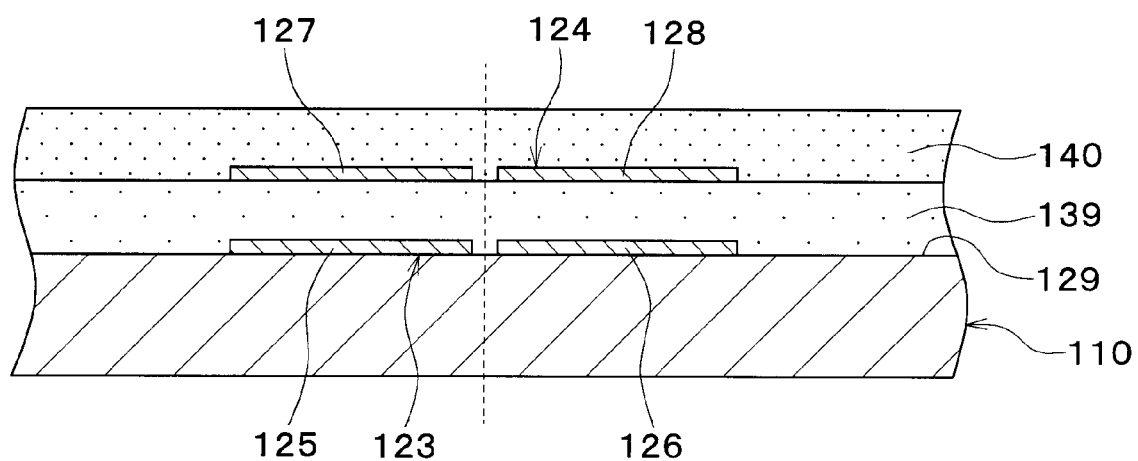
FIG. 24 is a cross-sectional view taken along a line XXIV-XXIV of FIG. 23.

In the present embodiment, configurations different from those of the first embodiment is described. As illustrated in FIGS. 23, 24, the first half-bridge circuit 123 and the second half-bridge circuit are disposed on the one surface 129 of the sensor chip 110 in a hierarchical form. In the present embodiment, the respective wiring patterns of the half-bridge circuits 123, 124 are formed in multi-layers, as the wiring pattern of the first half-bridge circuit 123 is disposed at the one surface 129 of the sensor chip 110.

In particular, the resistance portions 125, 126 of the first half-bridge circuit 123 are formed at the one surface 129 of the sensor chip 110. An interlayer insulating film 139 is formed on the one surface 129 of the sensor chip 110 to cover the resistance portions 125, 126. The resistance portions 127, 128 of the second half-bridge circuit 124 are formed on the interlayer insulating film 139. A protective film 140 is formed on the interlayer insulating film 139 to cover the resistance portions 127, 128.

The resistance portion 127 is position above the resistance portion 125, and the resistance portion 128 is positioned above the resistance portion 126. Even if the respective wiring patterns of the half-bridge circuits 123, 124 are formed in a two-layers structure, the center of balance of the wiring pattern of the half-bridge circuit 123 and the center of balance of the wiring pattern of the half-bridge circuit 124 coincide with each other, as viewed in an in-plane direction of the one surface 129 of the sensor chip 110. Accordingly, the effect similar to the one in the first embodiment may be attained.

In a modified example, the wiring pattern may be provided in a layered form, such that the wiring pattern of the second half-bridge circuit 124 is disposed at the one surface 129 of the sensor chip 110.

Third Embodiment

Figure 25:
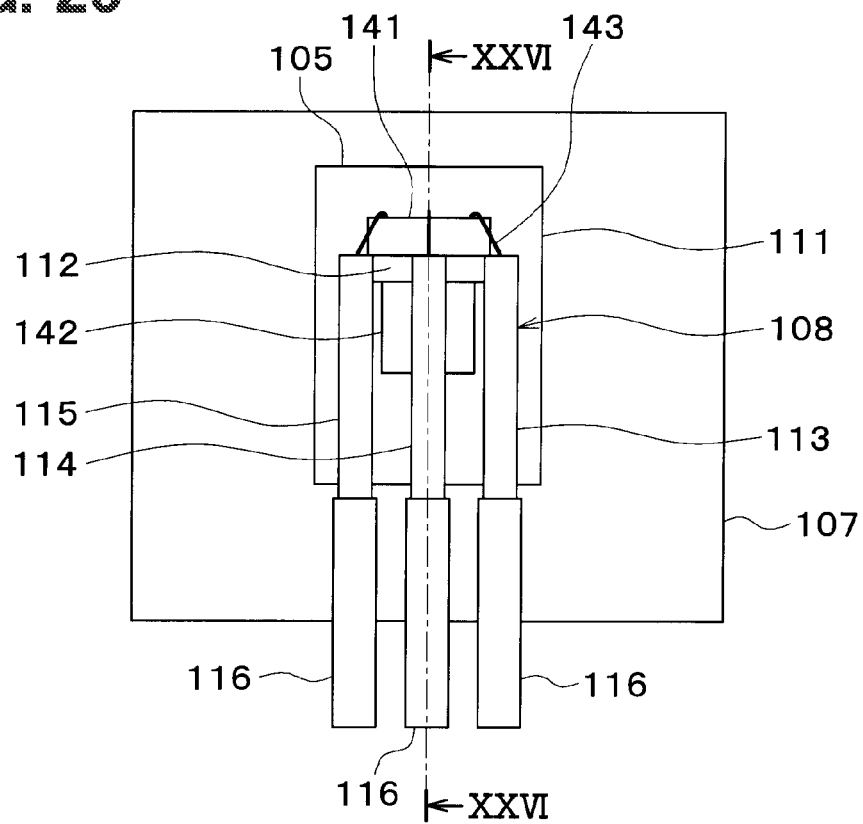
FIG. 25 is a plan view of components included in a magnetic detection system using a Hall-effect sensor, according to a third embodiment.
Figure 26:
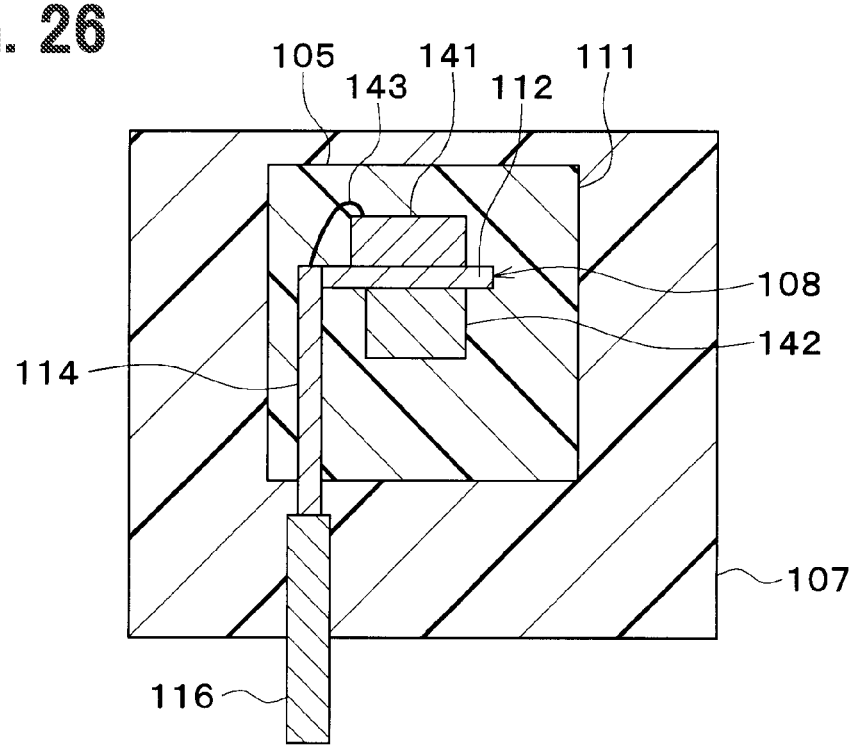
FIG. 26 is a cross-sectional view taken along a line XXVI-XXVI of FIG. 25.

In the present embodiment, configurations different from those of the first and second embodiments is described. When the magnetic detection system using a Hall-effect sensor is used, the mold IC 105 is inserted and fixed into the holder 107 as illustrated in a schematic plan view of FIG. 25 and a schematic cross-sectional view of FIG. 25. The mold IC 105 includes the lead frame 108, an IC chip 141, a magnet 142, and the mold resin 111.

The island 112 of the lead frame 108 is disposed so that a flat surface of the island 112 is parallel to the movement direction of a detection target. The leads 113 to 115 each are disposed to be vertical to the movement direction of the detection target. The ground lead 114 is integrated with the island 112 so as to form a right angle with the island 112. A terminal 116 is connected to a distal end of each of the leads 113 to 115.

The IC chip 119 includes plural Hall-effect sensors and a signal processing circuit. That is, the magnetic detection system using a Hall-effect sensor employs a one-chip configuration. The magnet 142 is fixed on a surface of the island 112 opposite to a surface on which the IC chip 141 is disposed. The leads 113 to 115 each are electrically connected via wires 121 to the IC chip 141. The mold resin 111 is molded in a shape fixed in the hollow part of the holder 107.

Figure 27:
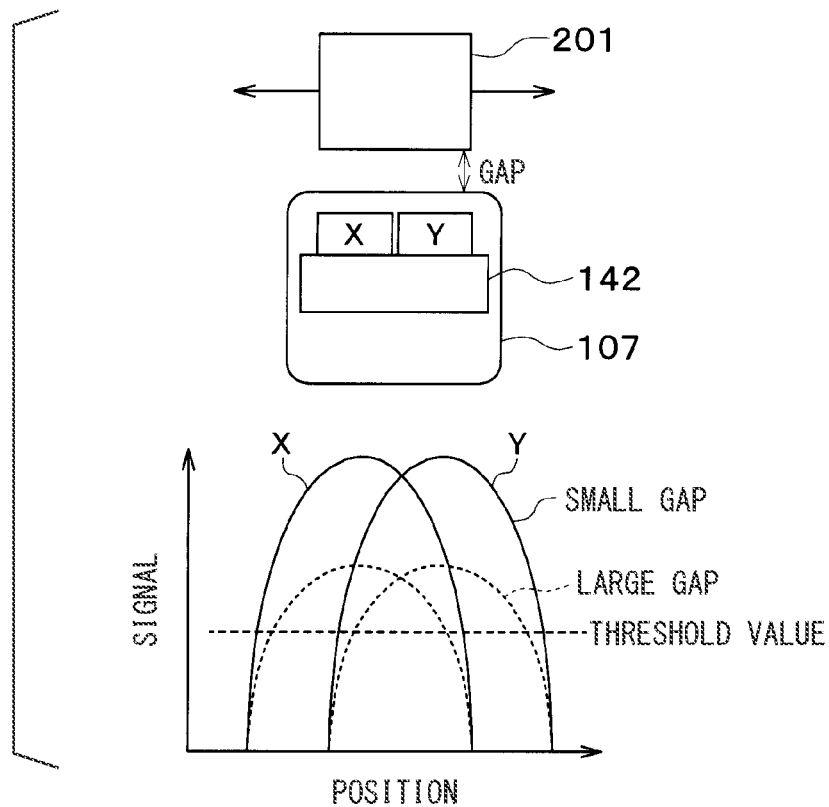
FIG. 27 illustrates a detection signal of the Hall-effect sensor.

A detection signal generated by the magnetic detection system using a Hall-effect sensor is described. As illustrated in FIG. 27, in a case where two Hall-effect sensors (X, Y) are disposed on the magnet 142, for example, when the protrusion part 201 moves relative to the holder 107, each detection signal is maximized according to the position of each Hall-effect sensor (X, Y). The relationship between a gap and the amplitude of a detection signal is similar to that of the magnetic detection system using a magnetic resistance element. It may be possible to detect the position of the protrusion part 201 by setting a threshold for each detection signal.

Figure 28:
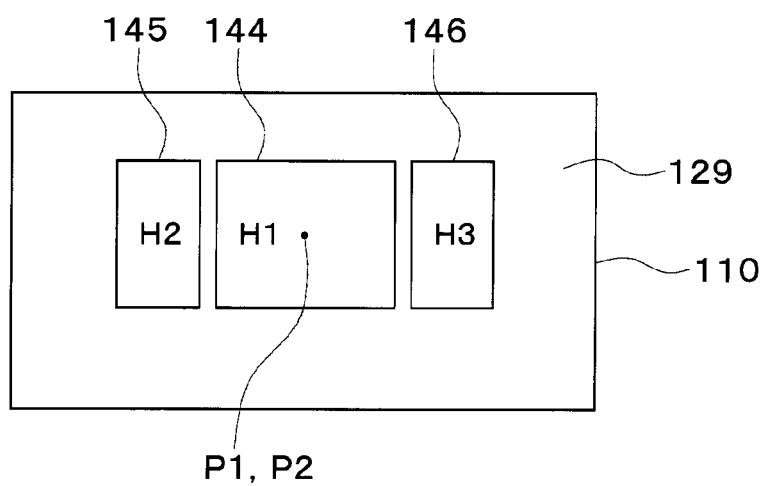
FIG. 28 is a plan view of respective layouts of three Hall-effect sensors.

In a situation of adopting a Hall-effect sensor as a detection element, it may be possible to provide the dual system with three Hall-effect sensors 144 to 146 (H1 to H3), as illustrated in FIG. 28. The Hall-effect sensor 144 outputs a signal of the first system. The Hall-effect sensor 144 is formed in, for example, a quadrilateral region. The center of balance of the Hall-effect sensor 144 is at P1 in FIG. 28. An output h1 of the Hall-effect sensor 144 represents a signal G3 in the first system.

The Hall-effect sensors 145, 146 output a signal of the second system. The Hall-effect sensors 145, 146 are arranged to be located apart from each other. The Hall-effect sensor 144 of the first system is sandwiched between the Hall-effect sensors 145 and 146. The Hall-effect sensors 145, 146 are formed in a quadrilateral region. The center of balance of each of the Hall-sensor elements 145, 146 is at P2 in FIG. 28. The sum (h2+h3) of an output h2 of the Hall-effect sensor 145 and an output h3 of the Hall-effect sensor 145 represents a signal G4 of the second system.

Figure 29:
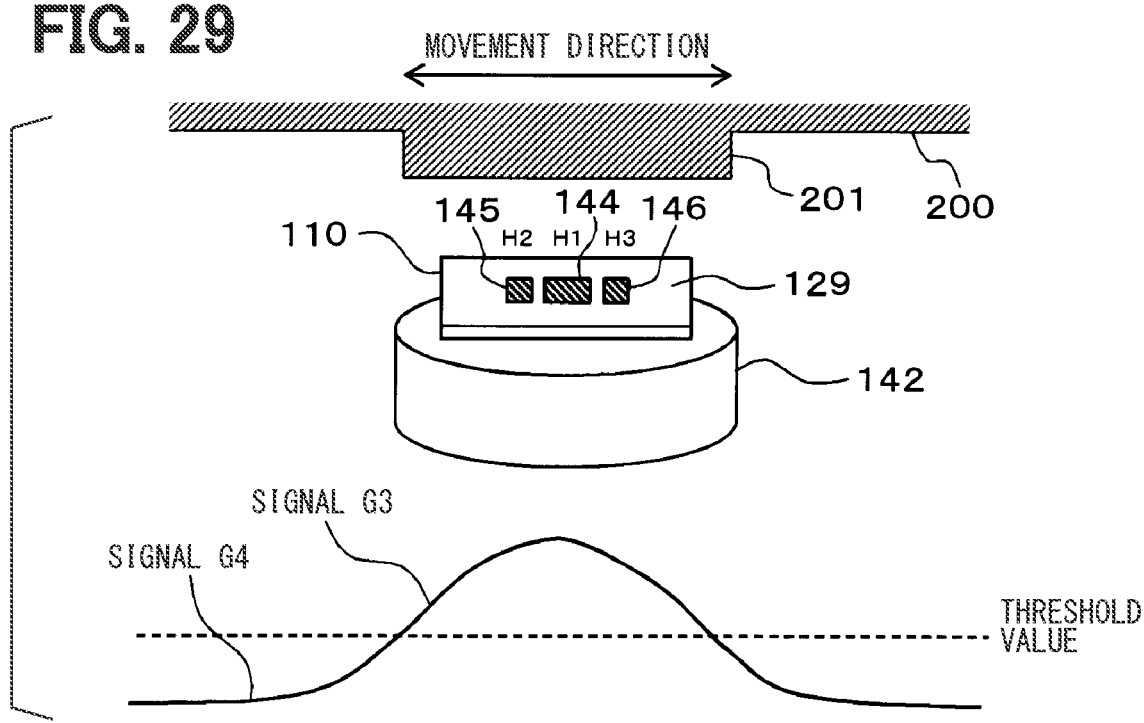
FIG. 29 illustrates respective signals G3, G4 of systems.

As similar to the first embodiment, the signal G3 of the first system and the signal G4 of the second system are the same waveform signals according to the above configuration, as illustrated in FIG. 29. Even though the Hall-effect sensors 144 to 146 are provided, no offset occurs between the signals G3 and G4 respectively in the first and second systems of the dual system.

Figure 30:
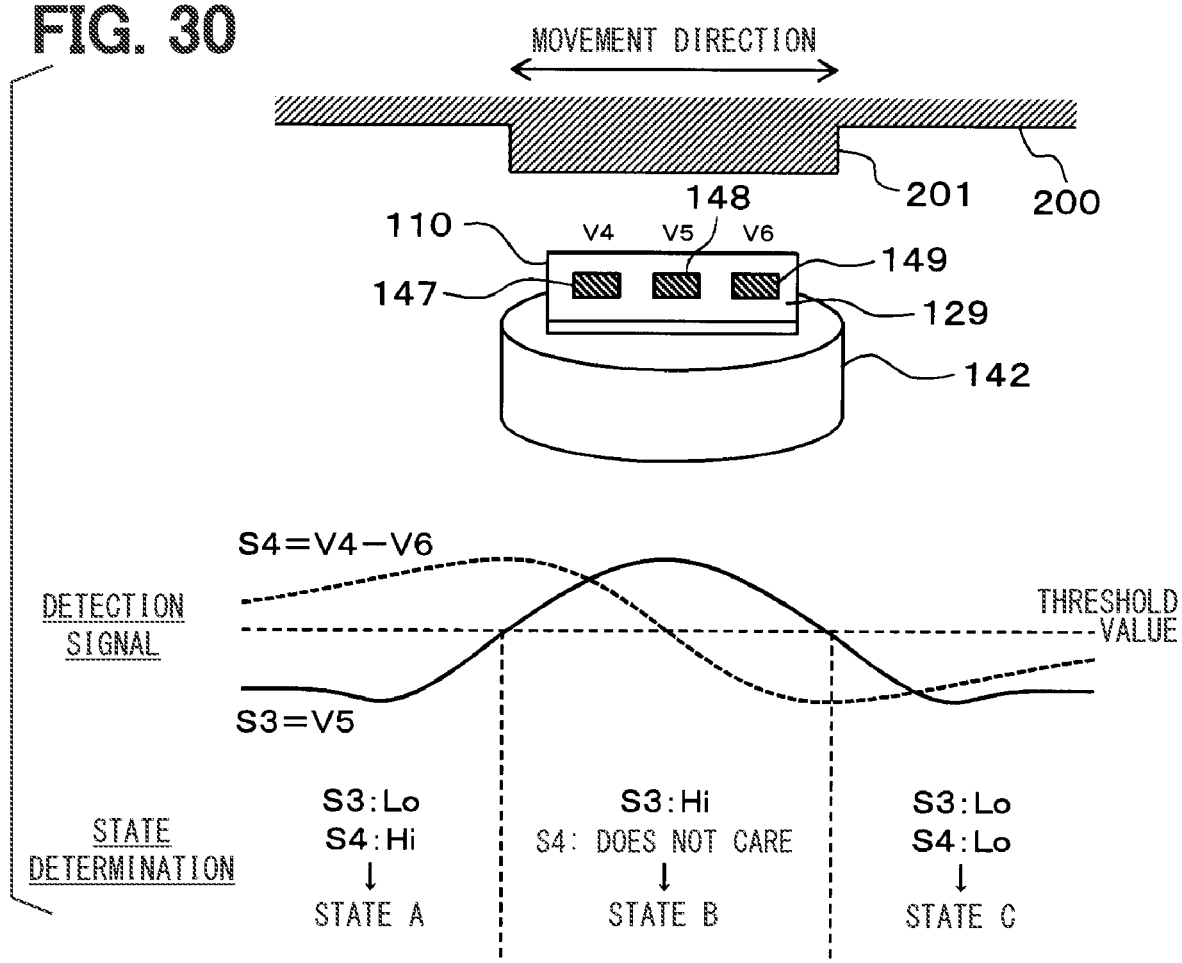
FIG. 30 illustrates detection signals and state determination in a situation of detecting three states through the Hall-effect sensor.

When the Hall-effect sensors 144 to 146 illustrated in FIG. 28 represent a single detection element, three detection elements 147 to 149 are included in the dual system as shown in FIG. 30. In this situation, when an output of the detection element 147 represents V4; an output of the detection element 148 represents V5; and an output of the detection element 149 represents V6, the detector 119 generates the signals S3 (=V5) and S4(=V4−V6), and outputs the signals to the signal processor 120 as detection signals. Because of the dual system, the detector 119 outputs to the signal processor 120 the signals S3, S4 of the first system as a first detection signal and the signals S3, S4 of the second system as a second detection signal. FIG. 30 illustrates a single system. The state determination is executed similarly to the one illustrated in FIG. 10 according to the first embodiment.

Figure 31:
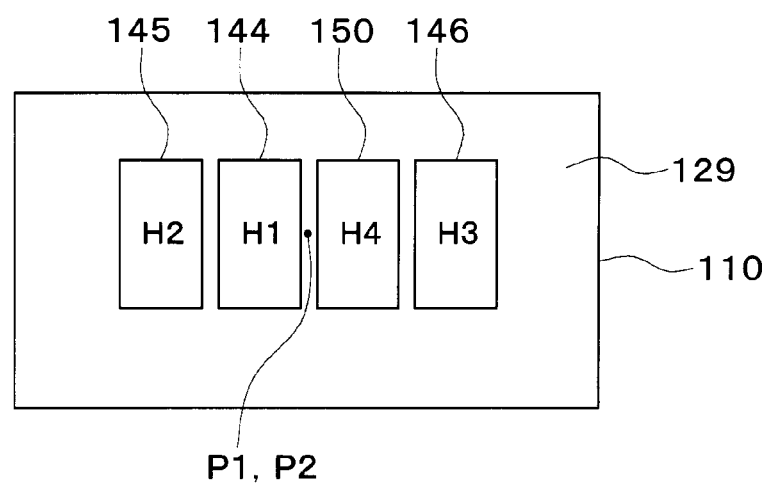
FIG. 31 is a plan view illustrating respective layouts of four Hall-effect sensors, as a modified example.

In a modified example, four Hall-effect sensors 144 to 146, 150 may be included in the dual system, as illustrated in FIG. 31. The arrangement of the Hall-effect sensors 144 to 146, 150 in this situation is the same as the one in FIG. 8.

The Hall-effect sensors 144, 150 included in the first system correspond to a first detection element, and the Hall-effect sensors 145, 146 included in the second system correspond to a second detection element.

Other Embodiments

The configuration of the position sensor 100 described in each embodiment is an example. The configuration of the position sensor 100 is not limited to the configurations described above and may be any other configurations that achieve the present disclosure. For example, the position sensor 100 is used not only for vehicles but also for industrial robots and manufacturing facilities as a sensor detecting the positions of movable components.

Although the present disclosure has been made in accordance with the embodiments, it is understood that the present disclosure is not limited to such embodiments and structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

What is claimed is:

1. A position sensor, comprising:
   a detector including
      a sensor chip having a surface,
      a first detection element disposed at the surface of the sensor chip, and
      a second detection element disposed at the surface of sensor chip; and
   a signal processor configured to process a signal input from the detector,
   wherein the first detection element, which has a first resistance portion and a second resistance portion that are included in a first half-bridge circuit, is configured to output a first detection signal corresponding to a position of a detection target, based on a change in a magnetic field received from the detection target,
   wherein the second detection element, which has a third resistance portion and a fourth resistance portion that are included in a second half-bridge circuit, is configured to output a second detection signal corresponding to the position of the detection target, based on the change in the magnetic field received from the detection target,
   wherein the third resistance portion, the first resistance portion, the second resistance portion, and the fourth resistance portion are aligned at the surface of the sensor chip in one direction arranged in this order,
   wherein the first resistance portion and the second resistance portion are aligned at the surface of the sensor chip to be adjacent to each other in the one direction,
   wherein the third resistance portion and the fourth resistance portion are aligned at the surface of the sensor chip to sandwich therebetween the first resistance portion and the second resistance portion in the one direction,
   wherein a center of balance of the first detection element is overlapped by a center of balance of the second detection element, and
   wherein a wiring pattern of the first half-bridge circuit and a wiring pattern of the second half-bridge circuit coexist at the surface of the sensor chip.

2. The position sensor according to claim 1,
   wherein the center of balance of the first detection element is a centroid of an area of the first half-bridge circuit, and
   wherein the center of balance of the second detection element is a centroid of an area of the second half-bridge circuit.

3. The position sensor according to claim 1,
   wherein the center of balance of the first detection element is a centroid of the wiring pattern of the first half-bridge circuit, and
   wherein the center of balance of the second detection element is a centroid of the wiring pattern of the second half-bridge circuit.

4. The position sensor according to claim 1,
   wherein the center of balance of the first detection element is a center of a layout of the first half-bridge circuit, and
   wherein the center of balance of the second detection element is a center of a layout of the second half-bridge circuit.

5. The position sensor according to claim 1,
   wherein the detection target includes a moveable component moving in conjunction with an operation of a shift position of a vehicle.

6. The position sensor according to claim 1,
   wherein the first detection element includes at least a first resistance portion and a second resistance portion in the first half-bridge circuit,
   wherein the second detection element includes at least a third resistance portion and a fourth resistance portion in the second half-bridge circuit, and
   wherein the first resistance portion and the second resistance portion are connected in series, and the third resistance portion and the fourth resistance portion are connected in series.

7. The position sensor according to claim 1,
wherein, in a plan view of the surface of the sensor chip in a direction normal to the surface of the sensor chip, the center of balance of the first detection element is overlapped by the center of balance of the second detection element.

8. The position sensor according to claim 1, wherein
a linear portion of wiring of the wiring pattern in the first resistance portion of the first half-bridge circuit and a linear portion of wiring of the wiring pattern in the second resistance portion of the first half-bridge circuit are in a line-symmetric form, and
a linear portion of wiring of the wiring pattern in the third resistance portion of the second half-bridge circuit and a linear portion of wiring of the wiring pattern in the fourth resistance portion of the second half-bridge circuit are in a line-symmetric form.

9. A position sensor, comprising:
a detector including
   a sensor chip having a surface,
   a first detection element disposed at the surface of the sensor chip, and
   a second detection element disposed at the surface of the sensor chip; and
a signal processor configured to process a signal input from the detector,
wherein the first detection element, which is included in a first half-bridge circuit, is configured to output a first detection signal corresponding to a position of a detection target, based on a change in a magnetic field received from the detection target,
wherein the second detection element, which is included in a second half-bridge circuit, is configured to output a second detection signal corresponding to the position of the detection target, based on the change in the magnetic field received from the detection target,
wherein a center of balance of the first detection element coincides with a center of balance of the second detection element,
wherein the first half-bridge circuit and the second half-bridge are disposed in multi-layers, such that one of a wiring pattern of the first half-bridge circuit or a wiring pattern of the second half-bridge circuit is disposed at the surface of the sensor chip, and
wherein one of the wiring pattern of the first half-bridge circuit or the wiring pattern of the second half-bridge circuit is disposed above another one of the wiring pattern of the first half-bridge circuit or the wiring pattern of the second half-bridge circuit in a detection normal to the surface of the sensor chip.

10. A position sensor, comprising:
a detector including
   a sensor chip having a surface,
   a first detection element disposed at the surface of the sensor chip, and
   a second detection element disposed at the surface of sensor chip; and
a signal processor configured to process a signal input from the detector,
wherein the first detection element, which is included in a first half-bridge circuit, is configured to output a first detection signal corresponding to a position of a detection target, based on a change in a magnetic field received from the detection target,
wherein the second detection element, which is included in a second half-bridge circuit, is configured to output a second detection signal corresponding to the position of the detection target, based on the change in the magnetic field received from the detection target,
wherein a center of balance of the first detection element coincides with a center of balance of the second detection element,
wherein a wiring pattern of the first half-bridge circuit and a wiring pattern of the second half-bridge circuit coexist at the surface of the sensor chip, and
wherein the first half-bridge circuit and the second half-bridge circuit are respectively configured to generate signals without a phase difference between a signal generated by the first half-bridge circuit and a signal generated by the second half-bridge circuit.

* * * * *